United States Patent [19]

Ohara et al.

[11] 4,370,667
[45] Jan. 25, 1983

[54] LASER RECORDER

[75] Inventors: Yuji Ohara; Masahiro Ohnishi, both of Asaka, Japan

[73] Assignee: Fuji Photo Film Co., Ltd., Kanagawa, Japan

[21] Appl. No.: 231,561

[22] Filed: Feb. 4, 1981

[30] Foreign Application Priority Data

Feb. 8, 1980 [JP] Japan ................................. 55/14627

[51] Int. Cl.³ .............................................. G01D 15/4
[52] U.S. Cl. ..................................... 346/108; 358/298
[58] Field of Search ............................ 346/76 L, 108; 358/296–300, 302; 369/124

[56] References Cited

U.S. PATENT DOCUMENTS 3,725,574 4/1973 Gast ................................ 346/108 X
4,001,492 1/1977 Suzuki et al. .................... 358/298 X

FOREIGN PATENT DOCUMENTS 55-102966 8/1980 Japan ................................... 358/298

OTHER PUBLICATIONS

IBM Technical Disclosure Bulletin, vol. 18, No. 3, "Adaptive Contrast Ranging for Images", Wong, Aug. 1975, pp. 914–917.

Primary Examiner—A. D. Pellinen
Assistant Examiner—W. J. Brady
Attorney, Agent, or Firm—Sughrue, Mion, Zinn, Macpeak & Seas

[57] ABSTRACT

A laser recorder capable of recording a picture having halftones with densities of more than several tens of levels. An input video signal is sampled with a sampling pulse in response to which a number of high frequency pulses are applied to a beam source with the frequency of the high frequency pulse signal being higher by these two orders of magnitude than the frequency of the sampling pulse signal. The phase of the sampling pulse signal is alternated between adjacent scanning lines to thereby improve the number of available halftone densities.

6 Claims, 12 Drawing Figures

FIG. 8A
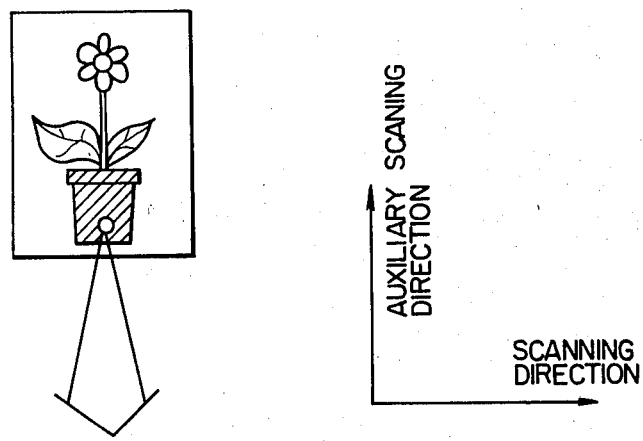
FIG. 8B  FIG. 8C
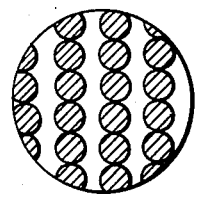 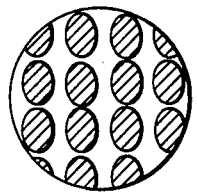
FIG. 8D  FIG. 8E
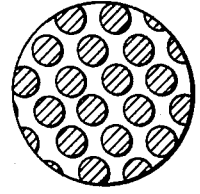 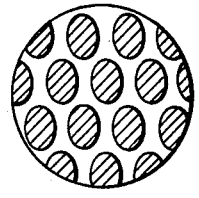

LASER RECORDER

BACKGROUND OF THE INVENTION

The present invention relates to a recorder having a semiconductor laser which can reproduce with densities of more than several tens of levels a picture such as a photograph having halftones.

A picture having halftones can be recorded by various techniques by which a laser beam is intensity-modulated. (1) In one of these techniques, an ultrasonic optical modulator is employed; (2) in another technique, the discharge current of a gas laser is changed, and (3) in a third technique, the current of a semiconductor laser is varied.

The first technique requires an expensive ultrasonic optical modulator and a fine adjustment device for setting the modulator to the Bragg angle. Thus, the first technique is disadvantageous in that the device has a high manufacturing cost and intricate construction. The gas laser discharge current modulation of the second technique suffers from drawbacks in that its modulation frequency range is very low, only several hundreds of Hertz, and the service life of the laser tube is reduced because the discharge current is varied. The third technique in which the current of the semiconductor laser is varied is also disadvantageous in that, since the semiconductor laser has an optical output current characteristic as indicated in FIG. 1, the optical output is greatly changed by changing the current only slightly, and accordingly it is considerably difficult to modulate the optical output by more than several tens of levels by changing the current.

Accordingly, an object of the invention is to provide a laser recorder which can record a picture having halftones with densities of more than several tens of levels. Another object of the invention is to provide a laser recorder which has several tens or several hundreds of optical modulation levels. A further object of the invention is to provide a laser recorder which can record a picture rich in halftones.

SUMMARY OF THE INVENTION

Provided according to the invention is a laser recorder using a semiconductor laser which utilizes the high frequency modulation characteristic of the semiconductor laser to provide more than several hundreds of modulation levels.

The invention provides an improved quality of an image recorded by a laser recorder device such as that disclosed in U.S. application Ser. No. 214,815 filed Dec. 9, 1980 (corresponding to Japanese Patent Application No. 168565/79 filed Dec. 25, 1979) filed by the present applicant. In this device, an input signal is sampled with a sampling pulse and a high frequency pulse signal whose frequency is higher by at least two orders of magnitude than that of the sampling pulse is applied to a semiconductor laser with the frequency of the high frequency pulse signal being controlled according to the input signal. A specific feature of the invention resides in that, in the laser recorder device described above, two sampling pulses of different phases are alternately employed for every scanning line.

The term "sampling pulse" as used herein is a pulse signal for sampling an input video signal at predetermined time intervals. The frequency of the sampling pulse can be selected as desired. However, it is preferable, in order to reproduce a picture with a high resolution, that the frequency be slightly higher than the highest frequency of the video signal. The term "high frequency pulse" is a pulse whose frequency is higher than that of the sampling pulse, preferably several hundreds to several ten thousands times higher. Both pulses may be generated separately although it is preferable to generate the sampling pulse by frequency-dividing the high frequency pulse as described later with reference to a preferred embodiment of the invention.

The amount of exposure for each of the picture elements forming a picture is determined by the number of high frequency pulses applied to the semiconductor laser according to the input video signal level during the sampling period. For instance, if the optical energy which the semiconductor laser applies to the photosensitive material for one high frequency pulse is represented by $\Delta e$ and the number of high frequency pulses which are provided according to an input video signal level for a picture element is represented by N, then the total optical energy applied to the picture element, that is, the amount of exposure E is: $E = N\Delta e$.

The number of high frequency pulses N does not correspond linearly to the input signal but also takes into consideration a logarithmic conversion relation and a recording material characteristic or an input/output characteristic which has been stored in advance.

The term "input signal" as used herein is a video signal although it may be an analog signal or a digital signal as well.

BRIEF DESCRIPTION OF THE DRAWINGS

FIGS. 8A-8E, taken together, are explanatory diagrams for a description of an image recorded by the laser recorder of the invention.

DESCRIPTION OF THE PREFERRED EMBODIMENTS

Figure 1:
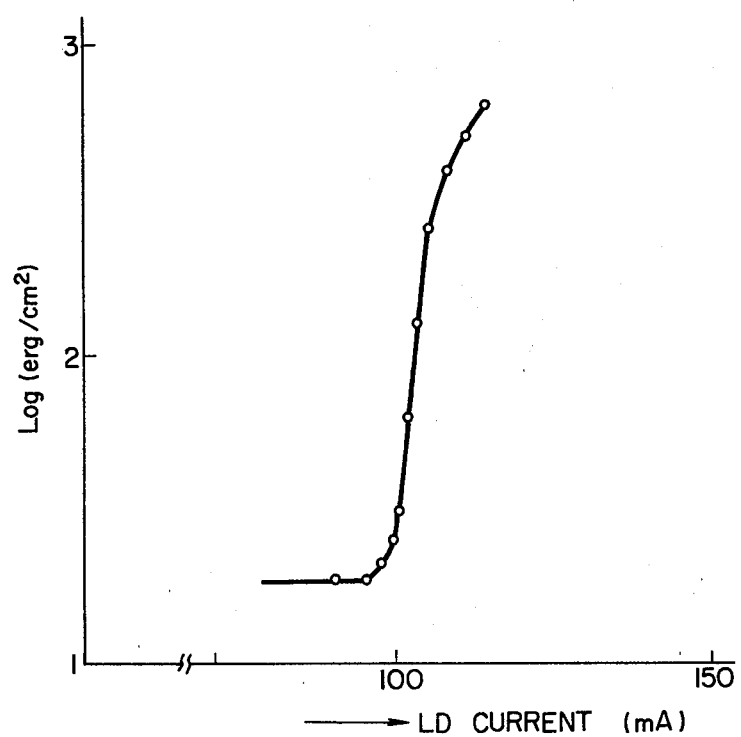
FIG. 1 is a graphical representation indicating a current-light emission characteristic of a semiconductor laser.
Figure 2:
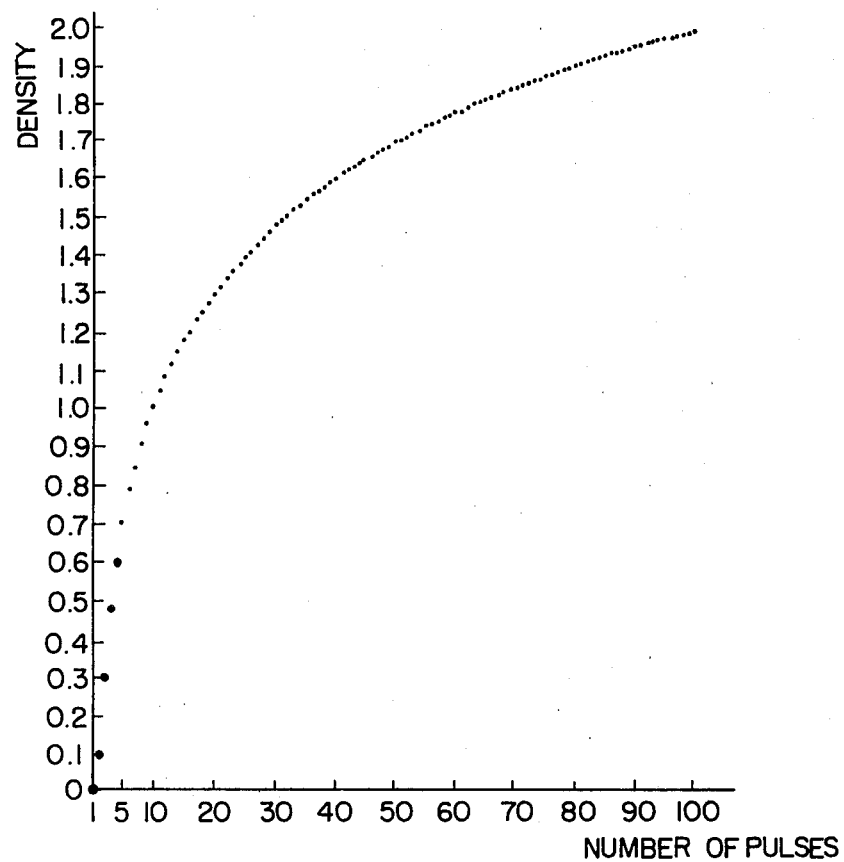
FIG. 2 is a graphical representation indicating pulse numbers controlling a semiconductor laser with recorded image densities.

The relation between the number of pulses applied and the density of a recorded image in the case where the semiconductor laser beam is modulated by pulses of a high frequency pulse signal will be described with reference to FIG. 2. FIG. 2 is a graphical representation indicating the above-described relation in the case where the data $\gamma$ (the gradient of the characteristic curve) of a recording material is 1 and the highest density is 2.0. When the intensity modulation is carried out with about 100 pulses, the density difference D changes by about 0.2 for each pulse while the density difference D changes only by about 0.1 for each pulse in the vicinity of about 20 pulses in the high density range. That is, in the case of FIG. 2, the gradations of low density are reproduced very coarsely. In order to reproduce more density levels, the sampling must be so performed that intensity modulation is carried out with the maximum number of pulses being 1000 or more.

As is clear from the above description, in order to produce gradations of about ten levels at equal density intervals, it is necessary to perform the intensity modulation over a range of 10 to 20 pulses and in order to reproduce gradations of more levels, it is necessary to perform the intensity modulation over a range of 100 to 1000 pulses.

A semiconductor laser can be pulse-modulated at high rate. In view of the foregoing, in accordance with the invention, the modulation high rate characteristic of a semiconductor laser is utilized to perform pulse modulation with a high frequency signal wherein the semiconductor laser beam is intensity-modulated with a high frequency signal higher in frequency by two or three orders of magnitude than the highest frequency of the input video signal to thereby accurately reproduce halftones on a recording sheet.

This invention will be described in further detail with reference to preferred embodiments.

Figure 3:
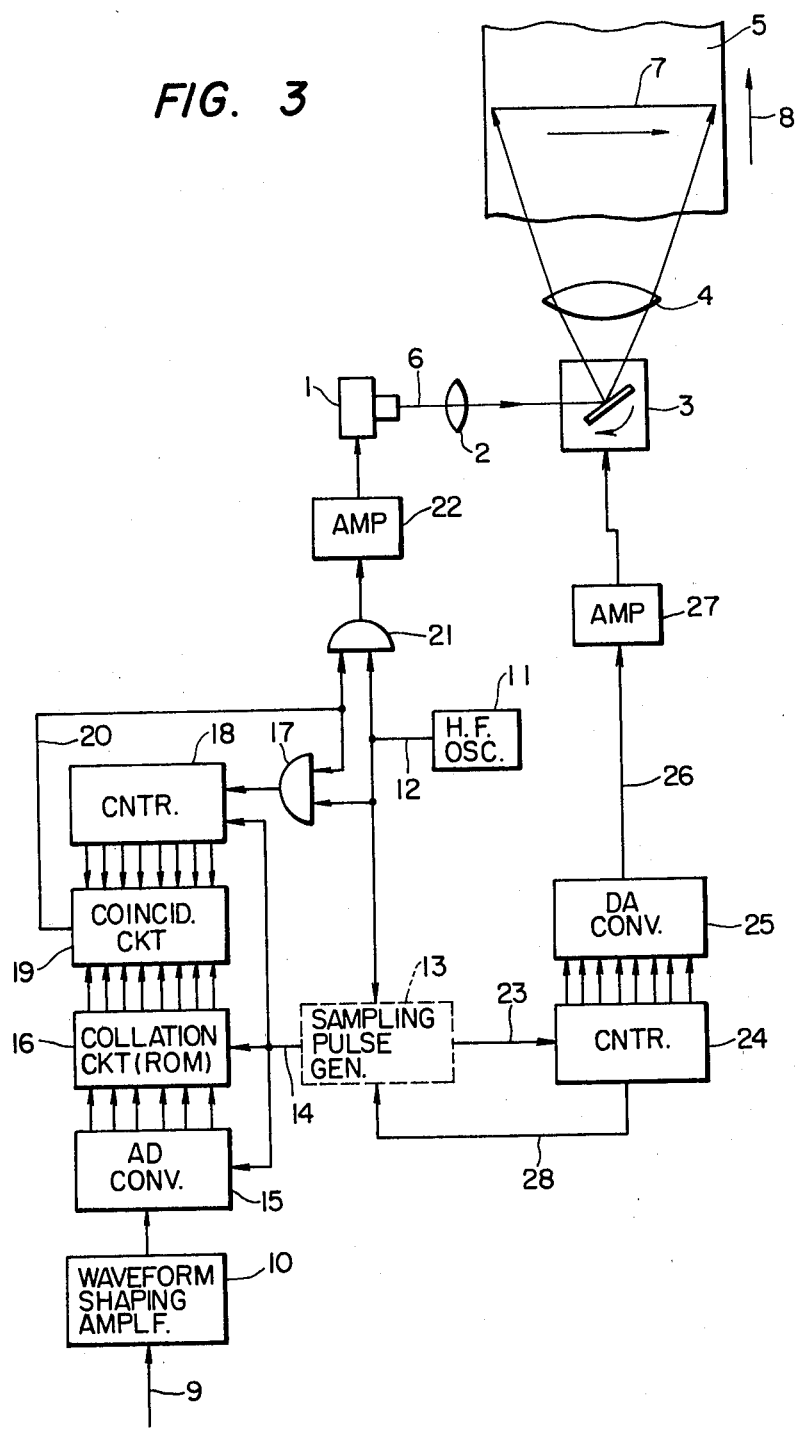
FIGS. 3 and 4 are block diagrams showing a preferred embodiment of a laser recorder constructed according to the invention.

FIG. 3 is a block diagram of a first preferred embodiment of a laser recorder according to the invention. The laser recorder, as shown in FIG. 3, includes a semiconductor laser 1, a beam shaping lens 2, a deflector 3, a focusing lens 4, and a recording sheet 5. It is desirable that the recording sheet be a silver salt photographic sheet or a xerographic sheet which can reproduce halftones and is sensitive to the red or infrared wavelength of a semiconductor laser beam. The semiconductor laser beam 6 is collimated by the beam shaping lens 2, deflected by the deflector 3, and formed into a spot having a predetermined size by the focusing lens 4 to carry out a main scanning operation over the recording sheet 5 to form a scanning line 7. The auxiliary scanning of the laser beam is carried out by moving the recording sheet 5 in the direction of the arrow 8. In this embodiment, the deflector 3 is a galvanometer.

A feature of the semiconductor laser is that it can be modulated with a pulse signal of a high frequency up to several hundreds of megahertz. By the use of high frequency pulse modulation, the quantity of light can be controlled by the number of pulses applied. For instance, if in the case where the highest video frequency is 10 KHz, a video signal sampled with 10 KHz pulses is pulse-modulated with a 10 MHz signal and the number of output pulses is controlled accordingly, modulation can be achieved with the number of pulses applied ranging from zero to several thousands according to the variations in magnitude of the video signal whereby accurate halftone modulation can be achieved.

An example of the above-described pulse modulation technique will be further described with reference to FIG. 3. The amplitude of an input video signal 9 is amplified to a predetermined level by a waveform shaping amplifier 10. In the embodiment described, the video signal is a received facsimile signal. A high frequency oscillator 11 outputs a high frequency pulse signal 12 which is applied to a sampling pulse generating circuit 13 which in turn outputs a sampling pulse signal 14. The detailed construction of the sampling pulse generating circuit 13 will be described later. In this embodiment, the frequency of the high frequency pulse signal 12 is 25 MHz and the frequency of the sampling pulse signal 14 is 25 KHz, for instance. As described above, the frequencies of the high frequency pulse signal 12 and the sampling pulse signal 14 are determined from the highest video frequency of the input video signal 9, the number of image density levels to be reproduced on the recording sheet 5, the exposure-density characteristic curve of the recording sheet 5, and the main scanning repetition frequency of the light beam on the recording sheet 5. An AD (analog-to-digital) converter 15, timed by the fall of the sampling pulse signal 14, samples the output signal of the amplifier 10 and converts it into a digital value. This digital value is held by the AD converter 15 until the next fall of the sampling pulse signal occurs. The signal thus subjected to analog-to-digital conversion is applied to a digital value collation circuit 16.

In this circuit, a signal corresponding to a read density of an input video signal is applied from the facsimile transmitter to the digital value collation circuit 16. The digital signal thus applied is converted into a digital value representative of the number of pulses of a high frequency pulse signal as indicated in FIG. 2 by the digital value collation circuit 16. In the described embodiment, in order to reproduce density levels more precisely than in the case described with reference to FIG. 2, zero to 1000 high frequency pulses are outputted as described above. The collation value depends on the exposure-density characteristic of the recording sheet. Therefore, it is necessary to set the collation value in accordance with this characteristic of the recording sheet to be used.

The digital value collation circuit 16 can be implemented by a read-only memory for instance. The digital value of the input video signal 9 is applied, as an address signal, to the circuit 16. As values corresponding to pulse numbers are stored as data at the addresses of the read-only memory, pulse numbers corresponding to applied address signals are outputted by the digital value collation circuit 16 with the timing of the sampling pulse signal. In this embodiment, the signal from the facsimile transmitter is expressed as a signal corresponding to a density which means that the signal has already been subjected to logarithmic conversion. However, in the case of a signal which is not subjected to logarithmic conversion, the logarithmic conversion operation may be included in the digital value collation circuit by appropriate choice of the digital values stored therein.

Further, the high frequency pulse signal 12 is applied through an AND gate 17 to the clock input terminal of a counter 18. The content of the counter 18 is cleared (or reset) by the sampling pulse signal 14 outputted by the sampling pulse generating circuit 13. The output of the counter 18 is compared with the output of the digital value collation circuit 16 by a coincidence circuit 19. When the two outputs coincide, the coincidence circuit 19 outputs a coincidence signal 20 of a logic "0". The coincidence signal 20 is applied to the AND gate 17 to close the AND gate 17 thereby to block the high frequency pulse signal 12. The coincidence signal 20 is further applied to an AND gate 21 to close the AND gate 21. Before the AND gate 21 is closed, the high frequency pulse signal 12 outputted by the high frequency oscillator 11 is applied through the AND gate 21 and the amplifier 22 to the semiconductor laser 1. The sampling pulse signal 14 is applied to the AD converter 15 and the counter 18 again and the AD converter 15 converts the input signal into a digital value which is further converted into a digital value representative of the density by the digital value collation circuit 16 and the content of the counter 18 is once again reset. If, in this operation, the input signal is not zero, the coincidence circuit 19 outputs a signal 20 of a logic "1" indicating noncoincidence which is applied to the AND gates 17 and 21 to open the gates 17 and 21 as a result of which the high frequency pulse signal 12 is applied to the amplifier 22 and the counter 18. Thus, the high frequency pulse signal 12 is applied through the amplifier 22 to the semiconductor laser 1 until the coincidence circuit 19 again provides a coincidence signal 20 of "0". By subjecting the semiconductor laser beam to optical modulation as described above, halftones can be recorded on the recording sheet 5 with several tens of density levels.

The sampling pulse generating circuit 13 outputs a clock pulse signal 23 whose frequency is equal to that of the sampling pulse signal 14. The clock pulse signal 23 is applied to the clock signal input terminal of a counter 24. The relation in phase between the sampling pulse signal 14 and the clock pulse signal 23 will be described later.

The counter 24 counts the pulses of the clock pulse signal 23 applied thereto and outputs a pulse of switching pulse signal 28, which may be a carry output of the counter 28, when the content of the counter 24 reaches a predetermined value. The switching pulse signal 28 is applied to the sampling pulse generating circuit 13. The output of the counter 24 is applied to a DA (digital-to-analog) converter 25 which in turn outputs a sawtooth wave signal 26 to drive a galvanometer 3. The sawtooth wave signal 26 is applied through an amplifier 27 to the galvanometer 3 in response to which the galvanometer 3 deflects a laser beam 6 to form a scanning line 7 on the recording sheet 5.

An image having halftones is recorded on the recording sheet 5 by a series of operations of the type described above. In order to explain the effects of the invention on the quality of an image recorded, the construction and operation of the sampling pulse generating circuit 13 will be described with reference to FIGS. 4 through 6.

Figure 4:
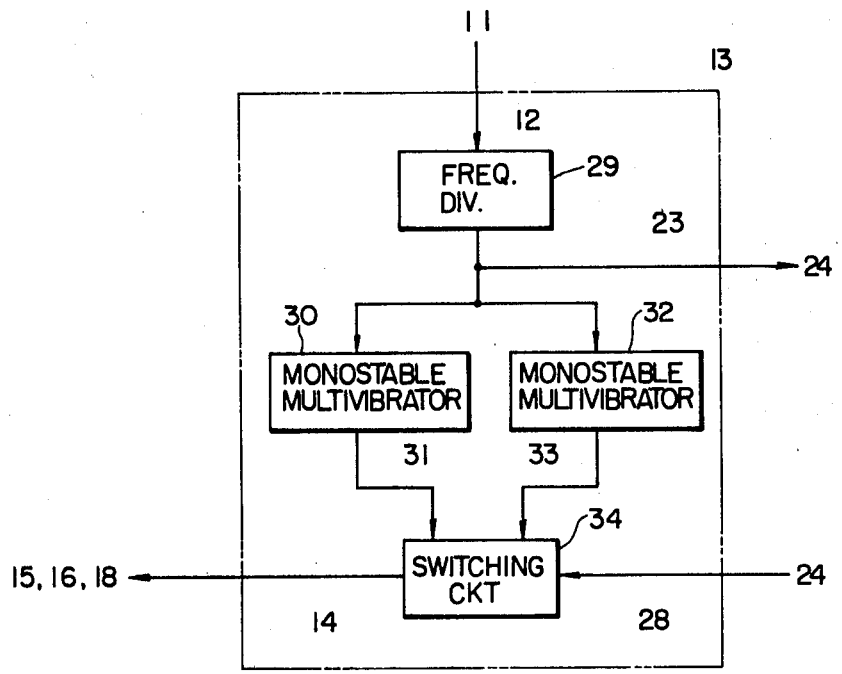
Figure 5:
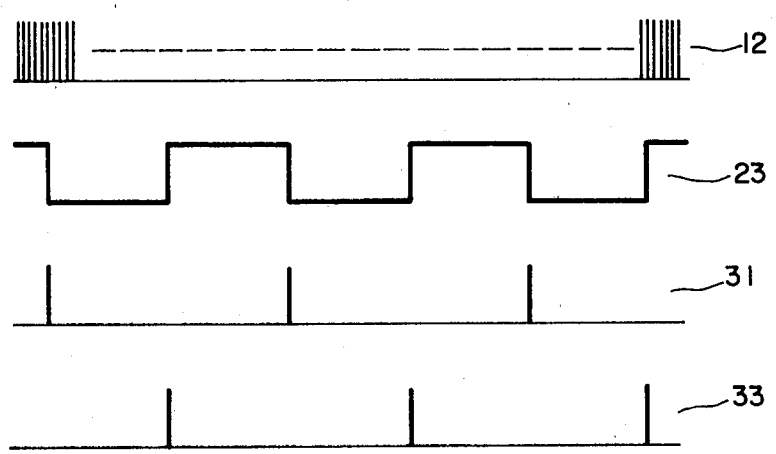
FIGS. 5, 6 and 7 are timing charts showing various signals in the laser recorder according to the invention.
Figure 6:
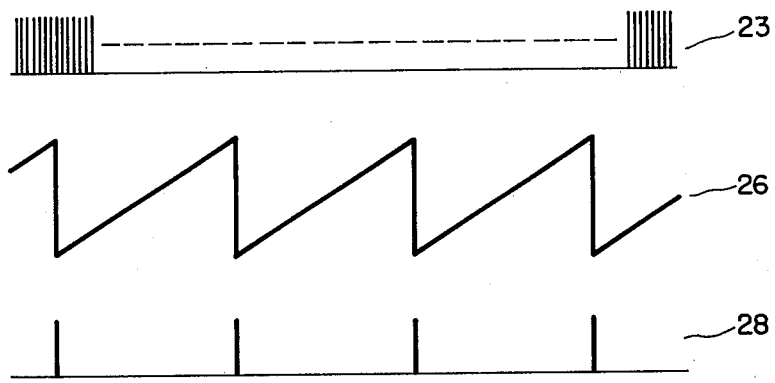

FIG. 4 is a block diagram showing the sampling pulse generating circuit 13 in more detail and FIGS. 5 and 6 are timing charts for a description of the operation of the circuit 13.

Referring to FIG. 4, the high frequency pulse signal 12 outputted by the high frequency oscillator 11 is applied to a frequency divider circuit 29 which in turn outputs the clock pulse signal 23. The frequency division ratio of the frequency divider circuit 29 is 1000:1 because the frequencies of the high frequency pulse signal and the sampling pulse signal are 25 MHz and 25 KHz, respectively, as described above. The clock pulse signal 23 is applied to the counter 24 to generate the sawtooth signal 26, as described before. The clock pulse signal 23 is further applied to monostable multivibrators 30 and 32. The monostable multivibrator 30, triggered by the fall of the clock pulse signal 23, outputs a pulse of a first sampling pulse signal 31. On the other hand, the monostable multivibrator 32 is triggered by the rise of the clock pulse signal 23 in response to which it outputs a second sampling pulse signal 33. The first and second sampling pulses signals 31 and 33 differ from each other only in phase with the phase difference being 180° in this embodiment. The above-described operations will become more apparent from the timing chart in FIG. 5.

The first and second sampling pulses signals 31 and 33 are supplied to a switching circuit 34 which selects and outputs one of the two sampling pulses as the sampling pulse signal 14 described above. This sampling pulse selecting operation is controlled by the switching pulse signal 28 which is generated by the counter 24. The pulses of the switching pulse signal 28 are outputted simultaneously when the counter 24 is cleared as described above, and therefore the switching of the first and second sampling pulse signals 31 and 33 is carried out by the switching circuit 34 for every main scanning line on the recording sheet. The above-described operations will become more apparent from the timing chart in FIG. 6.

Figure 7:
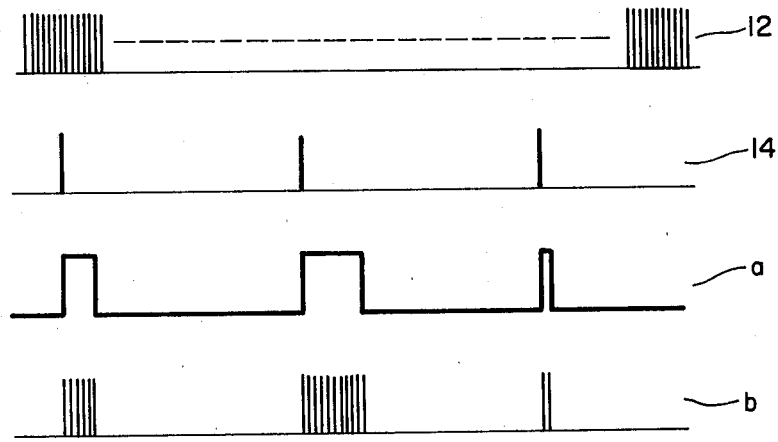

The signals applied to the semiconductor laser 1 can be readily understood by referring to the timing chart of FIG. 7 which shows the relation among the high frequency pulse signal 12, the sampling pulse signal 14, the state of the AND gate 21 (indicated at $a$) and the high frequency pulse signal applied to the semiconductor laser through the AND gate 21 (indicated at $b$).

The effects of the invention on the quality of a recorded image will be described with reference to FIGS. 8A–8E. FIG. 8A shows the entire recorded image, and FIGS. 8B–8E show various parts of the recorded image in larger scale. These parts have an intermediate densities. For convenience in illustration, each picture element of the recorded image is shown as a shadowed dot. In practice, the densities of the picture elements correspond to the input video signals.

More specifically, FIGS. 8B and 8C show the picture elements as recorded when the invention is not employed, that is, in the case where the recording is carried out with the phase of the sampling pulse 14 maintained unchanged. As shown in FIGS. 8B and 8C, the dots are regularly arranged not only in the main scanning direction but also in the auxiliary scanning direction.

In recording a halftone image of high resolution with the laser beam, the scanning lines are slightly overlapped one upon another, or a laser beam having an elliptic section elongated in the auxiliary scanning direction is used in order to prevent the formation of gaps between the scanning lines. FIG. 8B illustrates the former case and FIG. 8C the latter case. However, in both of these cases, a secondary drawback is involved that the dots in the intermediate density part of the image are prominantly coupled to one another in the auxiliary scanning direction. FIGS. 8E and 8D show arrangements of dots when the invention is employed. As is clear from a comparison of FIGS. 8E and 8D with FIGS. 8B and 8C, the secondary drawback due to the coupling of dots is eliminated and, accordingly, the image as a whole has a smooth texture.

With the semiconductor laser beam subjected to pulse modulation with a high frequency pulse signal according to the invention as described above, even a halftone image can be reproduced with a high image quality.

While the invention has been described with reference to preferred embodiments using particular numerical data, the invention is not limited thereto or thereby. That is, the technical concept of the invention can be practiced with various numerical data.

What is claimed is:

1. A laser recorder device comprising: means for scanning a recording medium with a plurality of parallel scanning lines; means for generating a recording beam in response to input pulses, said beam being scanned by said scanning means onto said recording medium; means for generating high frequency pulses for application to said beam generating means; means for generating sampling pulses for sampling an input signal, the frequency of said high frequency pulse signal being at least two orders of magnitude greater than the frequency of said sampling pulse signal, the phase of said sampling pulse signal being different for adjacent scanning lines; and means for applying a number of said pulses of said high frequency pulse signal to said beam generating means in response to a predetermined function of said sampled input signal.

2. The laser recorder device of claim 1 wherein said phase of said sampling signal differs by 180° between adjacent scanning lines.

3. The laser recorder device of claim 1 wherein said sampling pulse generating means comprises a frequency divider having an input coupled to an output of said means for generating said high frequency pulse signal; first and second monostable multivibrators having an input coupled to an output of said frequency divider; and switching circuit means for alternately selecting outputs of said first and second multivibrators, said switching circuit means operating in response to a signal indicative of an end of a scanning line.

4. A laser recorder device comprising: an analog-to-digital converter having an input coupled to a source of an input signal; a read-only memory having address inputs coupled to outputs of said analog-to-digital converter, said read-only memory having data stored therein corresponding to a predetermined function of said input signal; a coincidence circuit having a first set of inputs coupled to outputs of said read-only memory; a first counter having outputs coupled to a second set of inputs of said coincidence circuit; a high frequency pulse oscillator, a first AND gate having a first input coupled to an output of said high frequency pulse oscillator and an output coupled to a clock input of said first counter and a second input coupled to an output of said coincidence circuit; a second AND gate having a first input coupled to said output of said high frequency pulse oscillator and a second input coupled to said output of said coincidence circuit; a first amplifier having an input coupled to an output of said second AND gate; a recording beam source having an input coupled to an output of said first amplifier; means for scanning said beam onto the surface of a recording medium; a frequency divider having an input coupled to said output of said high frequency pulse oscillator; first and second monostable multivibrators having an input coupled to an output of said frequency divider; a switching circuit for selecting outputs of said first and second monostable multivibrators, an output of said switching circuit being coupled to a clock input of said analog-to-digital converter, said read-only memory and a reset input of said first counter; a second counter having a clock input coupled to said output of said frequency divider, an output of said second counter being coupled to a control input of said switching circuit; a digital-to-analog converter having digital inputs coupled to count outputs of said second counter; and a second amplifier having an input coupled to an analog output of said digital-to-analog converter, an output of said second amplifier being coupled to operate said scanning means.

5. The laser recorder device of claim 4 wherein said predetermined function of said input signal is determined in accordance with at least a material characteristic of said recording medium.

6. The laser recorder device of claim 4 wherein said predetermined function is determined at least in accordance with a material characteristic of said recording medium and the logarithm of said input signal.

* * * * *